United States Patent [19]
Gronemeyer

[11] Patent Number: 5,382,950
[45] Date of Patent: Jan. 17, 1995

[54] DEVICE FOR IMPLEMENTING AN INTERRUPT DISTRIBUTION IN A MULTI-COMPUTER SYSTEM

[75] Inventor: Michael Gronemeyer, Weddel, Germany

[73] Assignee: Siemens Aktiengesellschaft, Munich, Germany

[21] Appl. No.: 975,537
[22] PCT Filed: Jun. 3, 1991
[86] PCT No.: PCT/EP91/01021
  § 371 Date: Apr. 6, 1993
  § 102(e) Date: Apr. 6, 1993
[87] PCT Pub. No.: WO92/03786
  PCT Pub. Date: Mar. 5, 1992

[30] Foreign Application Priority Data
Aug. 14, 1990 [EP] European Pat. Off. ............ 90115584

[51] Int. Cl.⁶ .............................................. H04Q 1/00
[52] U.S. Cl. ............................. 340/825.5; 371/36; 364/183
[58] Field of Search ............ 340/825.5, 825.01, 825.16; 371/36; 364/183, 186, 187

[56] References Cited
U.S. PATENT DOCUMENTS

| | | | |
|---|---|---|---|
| 4,392,199 | 7/1983 | Schmitter et al. | 371/36 |
| 4,616,312 | 10/1986 | Vebel | 371/36 |
| 4,733,353 | 3/1988 | Jaswa | 395/650 |
| 4,829,198 | 5/1989 | Maley et al. | 371/36 |
| 5,031,180 | 7/1991 | McIver et al. | 371/36 |
| 5,233,615 | 8/1993 | Goetz | 371/36 |

FOREIGN PATENT DOCUMENTS 0271807 6/1988 European Pat. Off. .
2223751 10/1974 France .
3431169 3/1986 France .

OTHER PUBLICATIONS

IBM Technical Disclosure Bulletin, vol. 15, No. 4, Sep. 1972, New York, US, pp. 1172–1173, E. J. Franklin: *Software Synchronization of Multiple Computers*.

Primary Examiner—Donald J. Yusko
Assistant Examiner—Gregg V. Miller
Attorney, Agent, or Firm—Kenyon & Kenyon

[57] ABSTRACT

In an m-of-n computer system, timer signals (TA, TB, TC) are fed as interrupt requests (IA, IB, IC) to modules (BGA, BGB, BGC) allocated to the individual computers and from there to the majority elements (MA, MB, MC), which release appropriate interrupts (INT2A, INT2B, INT2C) to the corresponding computer when the m-of-n condition is adhered to. To be able to recognize, after one computer (for example MCA) has failed, when interrupt requests (IB) of another computer (for example MCB) fail to appear, each remaining operational computer (MCB, MCC) initiates troubleshoot testing programs in larger time intervals. This is achieved by performing OR-gating operations on certain timer signals. Switching through the interrupt requests via the majority elements requires much less time than does a corresponding software-comparison operation and results in only a very slight base load for the computer system during the processing of interrupts.

29 Claims, 1 Drawing Sheet

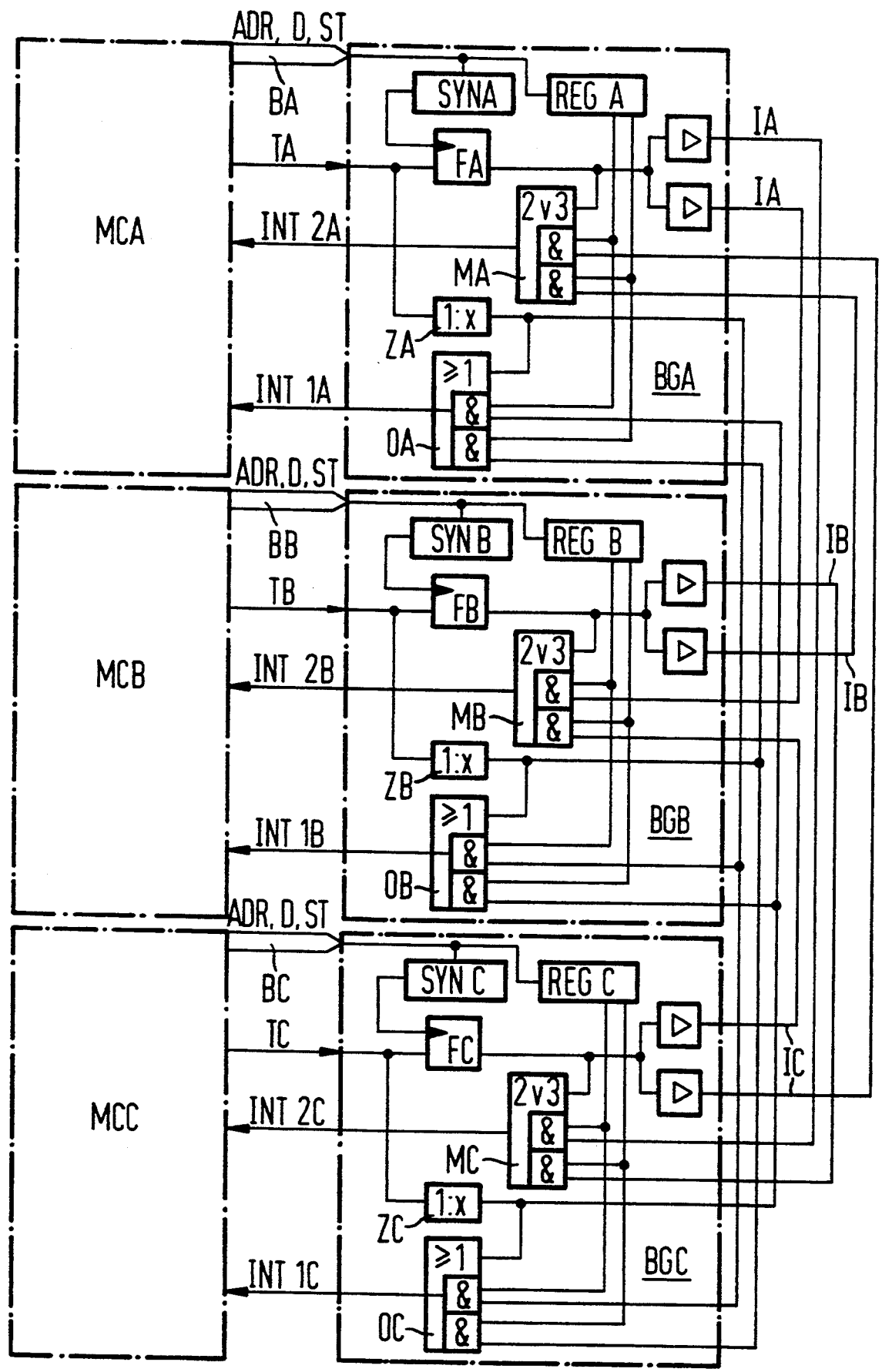

DEVICE FOR IMPLEMENTING AN INTERRUPT DISTRIBUTION IN A MULTI-COMPUTER SYSTEM

BACKGROUND OF THE INVENTION

The present invention relates to a device for distributing interrupts for updating messages and commands to individual computers of a secure multi-computer system. A publication by the firm Standard Elektrik Lorenz SELMIS, 1974.12822 discloses a three-channel computer system having a so-called interrupt controller, by means of which interrupts are entered into the three individual computers at the same time to interrupt the programs running at that time. Certain interrupts are only accepted when they fulfill the two-out-of-three condition, (i.e., when at least two of the three computers have supplied the proper control signals to interrupt the program). In dependence upon the significance of the bit position of the pending interrupt at the time, the interrupt output is delayed by specified delay times when only two of the three computers have actually emitted the appropriate control signals. The interrupt controller is a central module shared by all of the computers. Disturbances in the functioning performance of the interrupt module have an effect on the entire computer system and adversely affect both the integrity as well as the reliability of the computer system.

German Published Patent Application No. 34 31 169 discloses a method for synchronizing several parallel-working computers, wherein the computers synchronize their program runs by way of interrupts. To this end, each computer makes interrupt demands of itself and of its partner computers when certain programming points are reached. These interrupt demands only lead to an interrupt and, thus, to a synchronization of the program runs in the computers when they satisfy the two-out-of-three condition. It cannot be inferred from the afore-mentioned German Published Patent Application how process-initiated interrupts, i.e., messages and commands, are distributed to the computers and phased into the data processing of the computers.

SUMMARY OF THE INVENTION

The present invention relates to a device having decentralized functioning in which interrupts are distributed for updating messages and commands to individual computers of a secure multi-computer system. In case of a disturbance, the device limits the effect of this disturbance to only the computer channel actually affected by the disturbance. After one computer channel malfunctions, the occurrence of a another disturbance within the device is supposed to cause the computer system to be reliably shut down. Processing the interrupt represents only a smallest possible base load for the computer system. The present invention solves this task by using decentralized modules for the interrupt distribution. In this manner, any possible disturbance remains restricted to that computer channel to which this module is allocated. Because hardware-majority elements are used, no costly synchronization operations are required among the computers to handle the interrupts. If after a first module or a first computer channel fails, still a further module malfunctions, then this means that no further interrupt demands can be output via the majority elements, i.e., that the computer system has become altogether inoperative, because it no longer reacts to the process requirements. However, this is not recognized by the data-comparison operation being carried out among the computers. To nevertheless uncover the errors that have occurred, separate hardware measures are implemented to recognize the additional malfunction and to shut down the computer system.

Thus, an embodiment of the present invention will advantageously allow the control signals coming from the computers to be read into the data flow of the computers to make the interrupt request and to be fed in a timely fashion to the majority elements of the individual modules. This is achieved by specific control signals from the computer in accordance with another embodiment of the present invention.

To avoid undesirable reactions on the system among the individual modules, the interconnected inputs and outputs of these modules must be decoupled in accordance with a further embodiment of the present invention.

In accordance with claim 5, a computer that has been recognized as defective disconnects itself or splits off on the output side from the computer system and is, thus, prevented from having any further influence on the computer system.

Another embodiment of the present invention relates to masking or inhibiting individual inputs of OR-elements and/or majority elements. In this manner, a defective computer channel or a defective module is prevented from influencing the modules of the still intact computer channels.

This may be implemented using AND gates, which can be switched, as needed, into an inactive state by the operational computers.

In accordance with another embodiment of the present invention, means for optically characterizing certain operating states of the module components are allocated to the modules for service and repair operations.

BRIEF DESCRIPTION OF THE DRAWING

An exemplified embodiment of the present invention will be clarified in greater detail in the following on the basis of the drawing.

The drawing illustrates a multi-computer system which reliably controls any process event according to an embodiment of the present invention.

DETAILED DESCRIPTION

The drawing depicts a multi-computer system consisting of three computers, MCA, MCB and MCC, for reliably controlling any process event, such as controlling the travel paths of a railroad installation. The computers have the same hardware and each process the same data with the same software. For this purpose, the events coming from the process are read by way of three channels into the computer system and tested for conformity. The data fed to the individual computer busses are compared in an on-going operation, whereby in each case at least two of the computers must hold ready matching data to continue the process.

To compare the data fed to the computer busses on an ongoing basis, the computers must synchronize themselves to one another in the shortest possible time intervals. This type of synchronization is also required for outputting data (commands) and for reading-in data (messages), to guarantee that the computers always have the same database. To update the database, the program execution of the computers must be interrupted at the same point in each case, in order to then be able to read in current data, for example free and busy messages from track sections, and then to continue the program in all channels at the same place. Up until now, these data were read into the computers in that the computers generated interrupt requests to update data in specified time intervals. By means of a data exchange, the individual computers establish whether at least two computers have made interrupt requests in each case. They then induce the synchronous operation of their programs by means of the synchronization and cause their programs to be interrupted at the same point for updating data. In this manner, interrupt requests brought about by the malfunctioning of one computer are recognized by the computer system and rendered inactive. To compare the interrupt requests in terms of software, a time span of about one millisecond is necessary. The software test clarified above is not suited for a fast, cyclical interrupt in the microsecond range, because this test is too time-consuming and, given the assumed times, would already take up a base load of up to 50% of the computer processing time.

To decisively shorten the time needed to complete the m of n-evaluation during the processing of the interrupt, the present invention provides for this evaluation operation to be implemented outside of the computer hardware. For this purpose, an identically constructed module BGA, BGB, or BGC, is allocated to each computer of the multi-computer system. The module BGA, BGB or BGC communicates with the corresponding computer via a corresponding bus BA, BB or BC to transfer addresses ADR, data D and control signals ST. These modules receive timer signals TA, TB or TC in specified time intervals. The timer signals are derived, for example, from the high-frequency clock signals from clock generators, which can be allocated to the individual computers. The timer signals are output via scalers, in each case after a certain number of supplied clock signals. The timer signals are converted in the modules into interrupt-request signals. Their repetition rate must be selected in a manner that will guarantee that the program run is interrupted often enough, for example in intervals of two milliseconds. The timer signals are synchronized in flip-flops FA, FB, FC allocated to the modules. This is accomplished by means of synchronization modules, SYNA, SYNB, SYNC, whose design and mode of operation is not relevant to the clarification of the present invention and, therefore, will not be described further here. In each case, the interrupt processing is synchronized in two steps. The first step includes the transmission of interrupt-request signals derived from the timer signals through synchronization to downstream circuit elements of the modules. The second step includes the reading-in of the interrupts output by these circuit elements into the computers. To this end, the synchronization modules supply very specific control signals to the control inputs of the flip-flops, in each case before the synchronization signals are released, and the interrupts are read into the computers each time at an instant, in which the computers remain synchronized in the same state. Hardware majority elements, MA, MB or MC are arranged downstream from the individual flip-flops to carry out the m of n-evaluation of the interrupt request signals that are available in each case. On the input side, each majority element receives the interrupt-request signal from the corresponding computer and the interrupt-request signals from the remaining computers participating in the computer system. Only when at least two of the three computers in the example output an interrupt request at the same time, do the majority elements switch through and cause the interrupt INT2A, INT2B or INT2C to be simultaneously output to the particular corresponding computer of the computer system. The computer receiving this interrupt interrupts its own running program, reads in the interrupt, and continues its program run at the point designated by the interrupt. The computers no longer have to make a time-consuming software comparison when processing the interrupt to test whether at least two of the three computers have actually made interrupt demands. Instead, they merely execute the interrupt after it has been previously established by means of the corresponding majority that the two-out-of-three condition was adhered to. For this reason, only a very short interruption of the program run in the order of magnitude of 10 $\mu$s is required. This contrasts to an interrupt during a software comparison where interruption of the program run is in the order of magnitude of one millisecond. If after receiving a first interrupt-request signal, the majority elements are not switched through within a time span specified by a second signal, the processing of the interrupt is stopped, and a troubleshooting program is called up.

The outputs of the modules receiving the timer signals are decoupled from the inputs of the majority elements receiving these signals in the other modules by means of output amplifiers and decoupling resistors (not shown). The output amplifiers are able to be switched, as needed, into the inactive state by the corresponding computer.

If one of the three computers in the computer system fails, the remaining computers continue to work in the two-out-of-two mode. The failed computer disconnects itself from the computer system, or rather the computer system is disconnected by the computers which have not failed, when these computers detect the deviation that has crept in during the continual data-comparison operation and the defective computer has not disconnected itself. The data are preferably compared in external comparators to avoid having to use too much computing time for the comparison operation itself. A computer that has been recognized as defective is then disconnected by means of external comparators, which generate the information about the data deviations. A computer which is no longer fully operational can also be disconnected by means of the troubleshoot testing program.

When the three-computer system continues to be operated as a reliable two-out-of-two computer system after one computer has failed, any subsequent failure must result in the disconnection of the computer system, because it can then no longer be considered as reliable. However, the failure of an interrupt request to appear in the remaining two-out-of-two system can no longer be recognized through the interrupt distribution implemented by the majority elements. On the contrary, because the two-out-of-two condition is then absent, the majority elements of both modules would block interrupts from being output to the corresponding computers, and the computers themselves would then continue to work on matching program steps without processing interrupts. The error that has crept in cannot be recognized through the data-comparison operation. However, it must cause the computer system to be disconnected, because the database of the computer system is no longer being updated. In order to guarantee this, each module designed in accordance with the present invention contains a signal divider ZA, ZB or ZC. This signal divider is conceived, for example, as a counter. It is fed released timer signals by the corresponding computer and, after a certain number of timer signals, emits an output signal at its output. This output signal is carried to the input of an allocated OR element, OA, OB or OC, whose two other inputs are connected up to the signal dividers of the modules allocated to the two other computers. By means of these OR elements, interrupts INT1A, INT1B or INT1C are transmitted to the corresponding computers, as soon as even only one of the signal dividers emits an output signal. This is significant for a two-out-of-two system, in which one of the computers fails, or rather its interrupt request fails to appear. In this case, interrupts are supplied in larger time intervals, which are specified by the divider ratio of the signal dividers, to the attached computers to initiate troubleshoot testing programs. The computers, or rather the comparators allocated to them, then compare the counter contents of the computers and establish dissimilarity among the counters due to the different interrupt requests. This results in the computer system being disconnected. These testing programs are carried out regularly in larger time intervals, for example, given a signal-divider ratio of 1 to 100, within an interval of 200 milliseconds and, in fact, of course also when the two-out-of-three computer system is still functioning properly on the whole.

After one computer that has been recognized as defective fails, interrupt requests from this computer or its module are prevented from reaching other computers via their assigned modules by masking or inhibiting, as needed, the inputs of the majority elements receiving the output signals from the signal divider of this module or the interrupt-request signals from this computer and/or the OR elements in the modules of the still intact computers. This is done once via registers REGA, REGB or REGC, which are able to be adjusted by the still intact computers and by means of which the AND gates connected in series to the majority elements and/or to the OR elements are switched, as needed, to an inactive state and, on the other hand, by means of a computer-disconnect signal, with which the output signals from this computer are switched to a highly resistive/inactive state in the defective computer. The signals or requests coming from the module of the computer recognized as defective at the time can then no longer cause the logic elements in question to be switched through and, thus, remain without effectiveness for the remaining computer system.

The masking of individual inputs of the majority elements and OR elements is also advantageous when repairing a computer system after a single computer has failed. This is because as a result of the AND gates, which are able to be switched to an inactive state, as needed, no unwanted interrupt requests can be released, when one module is withdrawn, by interference signals on the supply conductors to the other modules, which could lead on the whole to the computer system being disconnected.

To rule out unintentional interaction among the modules allocated to the individual computers, the modules delivering the interrupt requests are decoupled from the modules receiving the interrupt request by means of output amplifiers and decoupling resistors (not shown).

The modules can be advantageously provided with means for optically characterizing the operating state of at least a few of their components. This makes it easier for maintenance personnel to perform troubleshooting tasks during repair work and, thus, shortens the downtime of a computer or computer system.

In the case of the above-described multi-computer system, the individual computers have the same hardware and are operated with the same software. However, the device according to the present invention is also applicable to multi-computer systems, in which the programs of the individual computers for solving the same task are not identical, but rather different from one another, when it is ensured that these programs lead to the same interim results and that these interim results are available often enough to carry out a result comparison in short intervals. In this case, it is also necessary to read-in interrupt requests to update messages and commands in short time intervals, and this can also be carried out here advantageously with the application of hardware majority elements and hardware circuit elements to introduce troubleshooting measures in larger time intervals.

What is claimed is:

1. A device for distributing interrupts for updating messages and commands to the individual computers of a secure multi-computer system having n-parallel-working individual computers, comprising a module capable of receiving timer signals in specified time intervals allocated to each of the individual computers of the multi-computer system for outputting interrupt-request signals derived from the timer signals, each of said modules comprising:

a hardware-majority element for carrying out an m-of-n evaluation of an interrupt-request signal produced by its own module and of interrupt-request signals produced by the other modules, and for outputting an interrupt signal to the corresponding computer when the m-of-n condition is fulfilled;

one counter for outputting an output signal after the supplying of a specified number of timer signals; and an OR-element having inputs connected to the outputs of the counter of their own module and to the outputs of the other modules, and an output which leads to an interrupt input of the corresponding computer to initiate a testing program to reveal different contents of the counters.

2. The device according to claim 1, wherein the timer signals on each module are fed to a flip-flop for synchronizing the interrupt-request signals into the data flow of the particular computer and wherein the synchronization operation takes place in two steps of first transmitting the interrupt-request signals to the majority elements of its own module and to those of the neighboring computers at the time, and second reading the interrupt signals into the computers.

3. The device according to claim 2, wherein the control inputs of the flip-flops receive control signals made available each time by the corresponding computer at the time and not used to synchronize the data flow.

4. The device according to claim 1, wherein the outputs of the modules emitting the interrupt-request signals are decoupled from the inputs of the modules receiving the interrupt-request signals by means of signal amplifiers and decoupling resistors.

5. The device according to claim 4, wherein the outputs of the modules emitting the interrupt-request signals are able to switch to the inactive state from the side of the corresponding computer when a computer-disconnect signal is present.

6. The device according to claim 1, wherein the inputs of the OR-element of one module are capable of receiving the output signals from the counters from the other modules at the time, and are able to be masked by the corresponding computer.

7. The device according to claim 6, wherein AND-gates are connected in an incoming circuit to the inputs of the OR-element which are capable of receiving output signals from the counters of the other modules at the time, and wherein one input of said AND-gate is signalled by the computer of the corresponding module to receive the output signal being applied at the time, and wherein, by means of a data-comparison operation, the computer detects when another of said individual computers fails and, as a result, switches those AND-gates through which the output signal arrives at the AND-gate in question, into an inactive state.

8. The device according to claim 1, wherein at least one of the modules further includes means for optically indicating an operating state of a component of said at least one module.

9. The device according to claim 1, wherein the inputs of the majority element of one module are capable of receiving the output signals from the interrupt-request signals from the other modules at the time, and are able to be masked by the corresponding computer.

10. The device according to claim 9, wherein AND-gates are connected in an incoming circuit to the inputs of the majority element which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority element in question, into an inactive state.

11. The device according to claim 6, wherein the inputs of the majority element of one module are capable of receiving the output signals from the interrupt-request signals from the other modules at the time, and are able to be masked by the corresponding computer.

12. The device according to claim 11, wherein AND-gates are connected in an incoming circuit to the inputs of the majority element which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority element in question, into an inactive state.

13. The device according to claim 2, wherein the inputs of the OR-element of one module are capable of receiving the output signals from the counters from the other modules at the time, and are able to be masked by the corresponding computer.

14. The device according to claim 13, wherein AND-gates are connected in an incoming circuit to the inputs of the OR-element which are capable of receiving output signals from the counters of the other modules at the time, and wherein one input of said AND-gate is signalled by the computer of the corresponding module to receive the output signal being applied at the time, and wherein, by means of a data-comparison operation, the computer detects when another of said individual computers fails and, as a result, switches those AND-gates through which the output signal arrives at the AND-gate in question, into an inactive state.

15. The device according to claim 2, wherein the inputs of the majority element of one module are capable of receiving the output signals from the interrupt-request signals from the other modules at the time, and are able to be masked by the corresponding computer.

16. The device according to claim 15, wherein AND-gates are connected in an incoming circuit to the inputs of the majority dement which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority dement in question, into an inactive state.

17. The device according to claim 3, wherein the inputs of the OR-element of one module are capable of receiving the output signals from the counters from the other modules at the time, and are able to be masked by the corresponding computer.

18. The device according to claim 17, wherein AND-gates are connected in an incoming circuit to the inputs of the OR-element which are capable of receiving output signals from the counters of the other modules at the time, and wherein one input of said AND-gate is signalled by the computer of the corresponding module to receive the output signal being applied at the time, and wherein, by means of a data-comparison operation, the computer detects when another of said individual computers fails and, as a result, switches those AND-gates through which the output signal arrives at the AND-gate in question, into an inactive state.

19. The device according to claim 3, wherein the inputs of the majority element of one module are capable of receiving the output signals from the interrupt-request signals from the other modules at the time, and are able to be masked by the corresponding computer.

20. The device according to claim 19, wherein AND-gates are connected in an incoming circuit to the inputs of the majority dement which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority element in question, into an inactive state.

21. The device according to claim 4, wherein the inputs of the OR-element of one module are capable of receiving the output signals from the counters from the other modules at the time, and are able to be masked by the corresponding computer.

22. The device according to claim 21, wherein AND-gates are connected in an incoming circuit to the inputs of the OR-element which are capable of receiving output signals from the counters of the other modules at the time, and wherein one input of said AND-gate is signalled by the computer of the corresponding module to receive the output signal being applied at the time, and wherein, by means of a data-comparison operation, the computer detects when another of said individual computers fails and, as a result, switches those AND-gates through which the output signal arrives at the AND-gate in question, into an inactive state.

23. The device according to claim 4, wherein the inputs of the majority element of one module are capable of receiving the output signals from the interrupt-request signals from the other modules at the time, and are able to be masked by the corresponding computer.

24. The device according to claim 23, wherein AND-gates are connected in an incoming circuit to the inputs of the majority element which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority element in question, into an inactive state.

25. The device according to claim 5, wherein the inputs of the OR-element of one module are capable of receiving the output signals from the counters from the other modules at the time, and are able to be masked by the corresponding computer.

26. The device according to claim 25, wherein AND-gates are connected in an incoming circuit to the inputs of the OR-dement which are capable of receiving output signals from the counters of the other modules at the time, and wherein one input of said AND-gate is signalled by the computer of the corresponding module to receive the output signal being applied at the time, and wherein, by means of a data-comparison operation, the computer detects when another of said individual computers fails and, as a result, switches those AND-gates through which the output signal arrives at the AND-gate in question, into an inactive state.

27. The device according to claim 5, wherein the inputs of the majority element of one module are capable of receiving the output signals from the interrupt-request signals from the other modules at the time, and are able to be masked by the corresponding computer.

28. The device according to claim 27, wherein AND-gates are connected in an incoming circuit to the inputs of the majority element which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority element in question, into an inactive state.

29. The device according to claim 1,
wherein the inputs of the OR-dement of one module are capable of receiving the output signals from the counters from the other modules at the time, and are able to be masked by the corresponding computer;
wherein AND-gates are connected in an incoming circuit to the inputs of the OR-element which are capable of receiving output signals from the counters of the other modules at the time, and wherein one input of said AND-gate is signalled by the computer of the corresponding module to receive the output signal being applied at the time, and wherein, by means of a data-comparison operation, the computer detects when another of said individual computers fails and, as a result, switches those AND-gates through which the output signal arrives at the AND-gate in question, into an inactive state;
wherein the inputs of the majority element of one module are capable of receiving the output signals from the interrupt-request signals from the other modules at the time, and are able to be masked by the corresponding computer; and
wherein AND-gates are connected in an incoming circuit to the inputs of the majority element which are capable of receiving interrupt-request signals from the other modules at the time, and wherein one input of said AND-gates is signalled by the computer of the corresponding module to receive the interrupt-request signals being applied at the time, and wherein, by means of a data-comparison operation, the computer detects when another of said individual computers fails and, as a result, switches those AND-gates through which the interrupt-request signal arrives at the majority element in question, into an inactive state.

* * * * *